United States Patent [19]

Kabune et al.

[11] Patent Number: 4,882,530

[45] Date of Patent: Nov. 21, 1989

[54] STEPPING MOTOR CONTROL APPARATUS

[75] Inventors: Hideki Kabune, Kariya; Kohji Kamiya, Chita; Kiyoshi Miyake, Kariya; Shigeru Saito, Kariya; Shinichi Yamada, Kariya; Ken Asami, Nagoya, all of Japan

[73] Assignees: Nippondenso Co., Ltd., Kariya; Toyota Jidosha Kabushiki Kaisha, Toyota, both of Japan

[21] Appl. No.: 236,181

[22] Filed: Aug. 25, 1988

[30] Foreign Application Priority Data

Aug. 29, 1987 [JP] Japan .................. 62-216034

[51] Int. Cl.⁴ .............................. G02P 8/00
[52] U.S. Cl. ..................... 318/696; 318/685
[58] Field of Search ............. 318/696, 685; 123/333, 123/440, 585

[56] References Cited

U.S. PATENT DOCUMENTS

3,896,363 7/1975 Kinsel et al. ............... 318/685
4,285,319 8/1981 Hattori et al. .............. 123/585
4,300,085 11/1981 Monma et al. ............. 318/696
4,347,821 9/1982 Saito ........................... 123/440
4,380,985 4/1983 Otsuka et al. .............. 123/440
4,541,378 9/1985 Kitamura ................... 123/333

Primary Examiner—William M. Shoop, Jr.
Assistant Examiner—Saul M. Bergmann
Attorney, Agent, or Firm—Cushman, Darby & Cushman

[57] ABSTRACT

In an all-phase de-energized state of the stepping motor, all motor windings having different phases are de-energized. After the all-phase de-energized state is detected, the motor windings are sequentially energized in accordance with predetermined phase energization patterns. Each of the energizations of the motor windings lasts for a given interval chosen to allow the stepping motor to generate a starting torque greater than a maximal load torque. After energizations of the motor windings corresponding to one cycle of the phase energization patterns are completed, durations of the energizations of the motor windings are gradually shortened to increase a rotational speed of the stepping motor.

6 Claims, 5 Drawing Sheets

STEPPING MOTOR CONTROL APPARATUS

BACKGROUND OF THE INVENTION

This invention relates to an apparatus for controlling a stepping motor usable in various devices such as a throttle drive device of an automotive traction control system.

Japanese published examined Patent application No. 57-54613 discloses an air flow rate adjustment apparatus including a pulse motor driving a control valve. During a predetermined interval in a start, the motor is driven by a low-frequency pulse signal to generate a great torque. After the predetermined interval elapses, the motor is driven by a high-frequency pulse signal.

In the apparatus of Japanese Patent application No. 57-54613, during the predetermined interval, the motor speed is low since the motor is driven by the low-frequency pulse signal. Accordingly, if the predetermined interval is long, the motor is unsuitable for a control system required to have a quick response such as an automotive throttle valve control system. If the predetermined interval is extremely short, the torque output tends to be insufficient and thus the motor sometimes falls into hunting or racing. Especially, if the motor is used at a low temperature, the viscosity of grease in the motor is high and a starting motor torque is inadequate so that the motor sometimes fails to start.

In the apparatus of Japanese Patent application No. 57-54613, while the motor is driven by the high-frequency pulse signal, the duration of the drive pulse is extremely short and thus it is generally difficult to detect a malfunction of windings of the motor on the basis of the drive pulse.

SUMMARY OF THE INVENTION

It is an object of this invention to provide a stepping motor control apparatus which enables a reliable start of the motor while maintaining a quick response of the motor.

It is another object of this invention to provide a stepping motor control apparatus which enables a diagnosis related to the motor.

In a stepping motor control apparatus of this invention, a device detects an all-phase de-energized state of a stepping motor in which all motor windings having different phases are de-energized. After the all-phase de-energized state is detected, the motor windings are sequentially energized in accordance with predetermined phase energization patterns. Each of the energizations of the motor windings lasts for a given interval chosen to allow the stepping motor to generate a starting torque greater than a maximal load torque. After energizations of the motor windings corresponding to one cycle of the phase energization patterns are completed, durations of the energizations of the motor windings are gradually shortened to increase a rotational speed of the stepping motor.

DESCRIPTION OF THE PREFERRED EMBODIMENT

Figure 1:
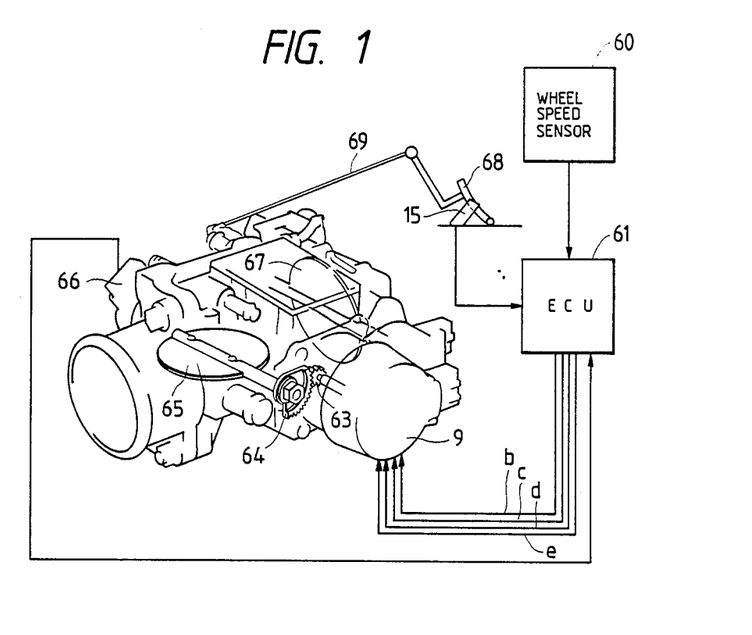
FIG. 1 is a diagram of an automotive vehicle control system including a stepping motor control apparatus according to an embodiment of this invention.

FIG. 1 shows an automotive vehicle control system which closes a sub throttle valve to prevent the generation of an excessively great engine torque when vehicle wheels slip during a start of the vehicle.

As shown in FIG. 1, the vehicle control system includes sensors 60 for detecting rotational speeds of respective vehicle wheels, and accelerator angle sensor 15 for detecting an angular position or a degree of depression of an accelerator pedal 68. A controller or an electronic control unit (ECU) 61 receives output signals from the vehicle wheel speed sensors 60 and the accelerator angle sensor 15 and determines a target angle of a sub throttle valve 65 in accordance with the sensor signals. The target angle of the sub throttle valve 65 is chosen so as to suppress the slippage of the vehicle wheels. The ECU 61 also receives an output signal from a sensor 66 detecting an angle of or a degree of opening through the sub throttle valve 65. In order to move the actual angle of the sub throttle valve 65 to the target angle, the ECU 61 generates a current change signal "a" (described hereinafter) and phase selection signals "b", "c", "d", and "e" in accordance with 1-2-phase energization patterns (see FIG. 2). The phase selection signals "b"-"e" are applied to a stepping motor 9 driving the sub throttle valve 65.

The sub throttle valve 65 extends into an air intake passage within an automotive internal combustion engine to adjust the rate of air flow into combustion chambers of the engine. The adjustment of the air flow rate allows control of the power output of the engine.

An output shaft of the stepping motor 9 is mechanically coupled to the sub throttle valve 65 via a combination of a pinion gear 63 and a cam gear 64. A main throttle valve 67 is connected to the accelerator pedal 68 via a link 69 so that the main throttle valve 67 moves in accordance with the angle of the accelerator pedal 68.

Figure 2:
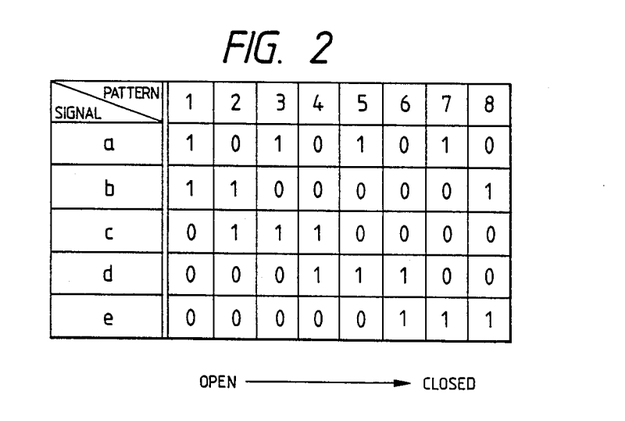
FIG. 2 is a diagram showing the relationship between phase selection signals and phase energization patterns in the stepping motor control apparatus of FIGS. 1 and 3.

The stepping motor 9 is of the four-phase type. FIG. 2 shows eight different patterns 1-8 of phase energization of the four-phase stepping motor 9. In FIG. 2, the characters "1" mean that the related signals are in active states. The characters "0" mean that the related signals are in inactive states. During the control of the stepping motor 9, as the phase energization pattern moves in a direction from the pattern 1 to the pattern 8, the sub throttle valve 65 closes. As the phase energization pattern moves in the opposite direction, the sub throttle valve 65 opens.

Figure 3:
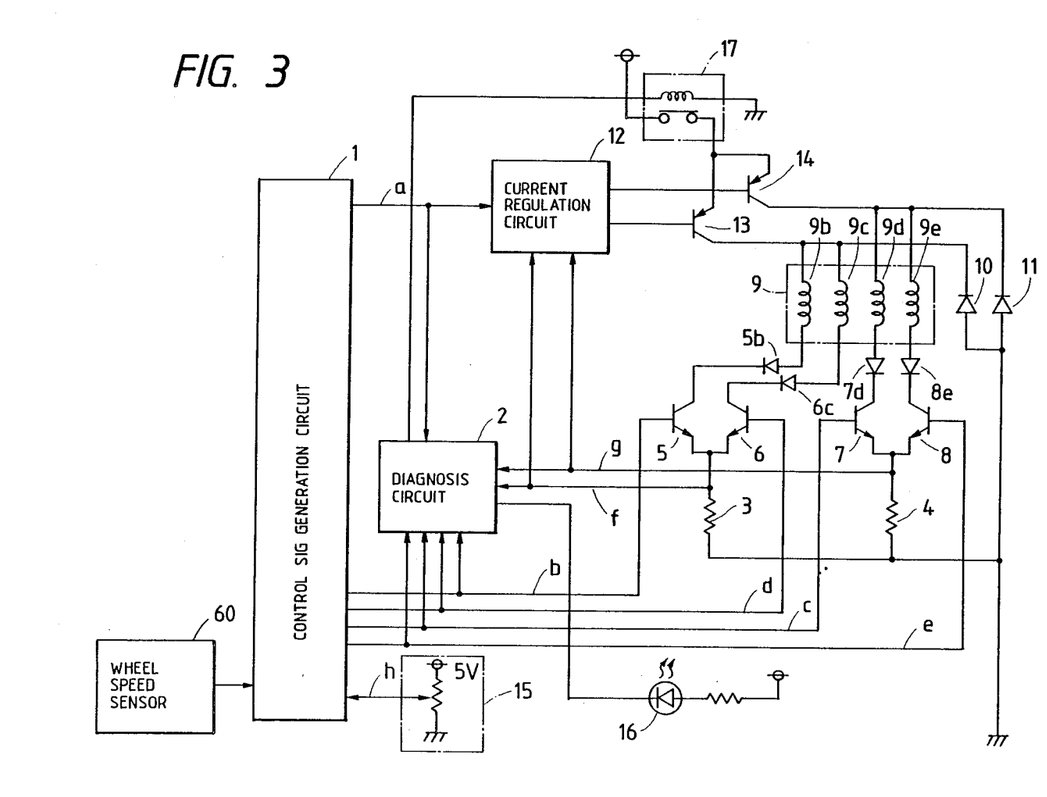
FIG. 3 is a diagram of the stepping motor control apparatus of FIG. 1.

As shown in FIG. 3, the stepping motor 9 includes four windings 9b, 9c, 9d, and 9e corresponding to the four phases. The motor winding 9b is connected across an electric power source (not shown) via a switch of a main relay 17, a current regulation transistor 13, a diode 5b, a current switching transistor 5, and a resistor 3. The motor winding 9c is connected across the electric power source via the switch of the main relay 17, the current regulation transistor 13, a diode 6c, a current switching transistor 6, and the resistor 3. The motor winding 9d is connected across the electric power source via the switch of the main relay 17, a current regulation transistor 14, a diode 7d, a current switching transistor 7, and a resistor 4. The motor winding 9e is connected across the electric power source via the switch of the main relay 17, the current regulation transistor 14, a diode 8e, a current switching transistor 8, and the resistor 4. Provided that the switch of the main relay 17 is closed and that the current regulation transistors 13 and 14 are conductive, the motor windings 9-9e are energized and de-energized when the related current switching transistors 5-8 are conductive and non-conductive respectively.

A stepping motor control section of the ECU 61 includes a control signal generation circuit 1 outputting the phase selection signals "b", "c", "d", and "e" to the current switching transistors 5, 7, 6, and 8 respectively. When the phase selection signals "b"-"e" are "1" and "0", the related current switching transistors are conductive and non-conductive so that the related motor windings are energized and de-energized respectively. In other words, the energized winding phase or phases are selected via the phase selection signals "b"-"e". The stepping motor 9 is controlled in accordance with this phase selection, moving the sub throttle valve 65 (see FIG. 1) toward a target position.

The resistors 3 and 4 detect currents passing through the motor windings 9b-9e and generate current feedback signals "f" and "g" representing the detected motor currents. A current regulation circuit 12 receives the current feedback signals "f" and "g". The current regulation circuit 12 controls the current regulation transistors 13 and 14 in accordance with the current feedback signals "f"and "g", regulating a current, passing through the stepping motor 9, at essentially a control value. The control signal generation circuit 1 outputs the current change signal "a" to the current regulation circuit 12. The current regulation circuit 12 changes the control value of the motor current in accordance with the current change signal "a".

The control signal generation circuit 1 receives the output signals from the accelerator angle sensor 15 and the vehicle wheel speed sensors 60.

A diagnosis circuit 2 monitors the current change signal "a", the phase selection signals "b"-"e", and the current feedback signals "f"and "g" and performs a diagnosis by using the monitored signals.

The diagnosis circuit 2 is connected to a control winding of the main relay 17 to control the main relay 17. When the diagnosis circuit 2 de-energizes the control winding of the main relay 17, the switch of the main relay 17 is opened so that the supply of the drive currents to the stepping motor 9 is interrupted. When the diagnosis circuit 2 energizes the control winding of the main relay 17, the switch of the main relay 17 is closed so that the supply of the drive currents to the stepping motor 9 is allowed. The control winding of the main relay 17 is normally energized.

The diagnosis circuit 2 is connected to a warning lamp 16 to control the warning lamp 16. As will be described hereinafter, when a malfunction is detected, the diagnosis circuit 2 activates the warning lamp 16.

The control signal generation circuit 1 includes a microcomputer having a combination of an input/output circuit, a central processing unit, a read-only memory (ROM), and a random-access memory. The control signal generation circuit 1 operates in accordance with a program stored in the ROM. The program includes a main routine and a subroutine.

Figure 4:
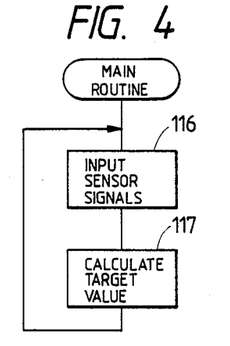
FIG. 4 is a flowchart of a main routine of a program operating the control signal generation circuit of FIG. 3.

As shown in FIG. 4, a first block 116 of the main routine inputs the signals from the vehicle wheel speed sensors 60, the accelerator angle sensor 15, and the throttle angle sensor 66. A block 117 subsequent to the block 116 calculates or determines a target angle of the sub throttle valve 65 in accordance with the input sensor signals. The target angle of the sub throttle valve 65 is designed so as to reliably suppress the slippage of the vehicle wheels. The target angle of the sub throttle valve 65 is represented by a target value. After the block 117 determines the target angle, the program returns to the block 116. Accordingly, the blocks 116 and 117 are periodically reiterated.

Figure 5:
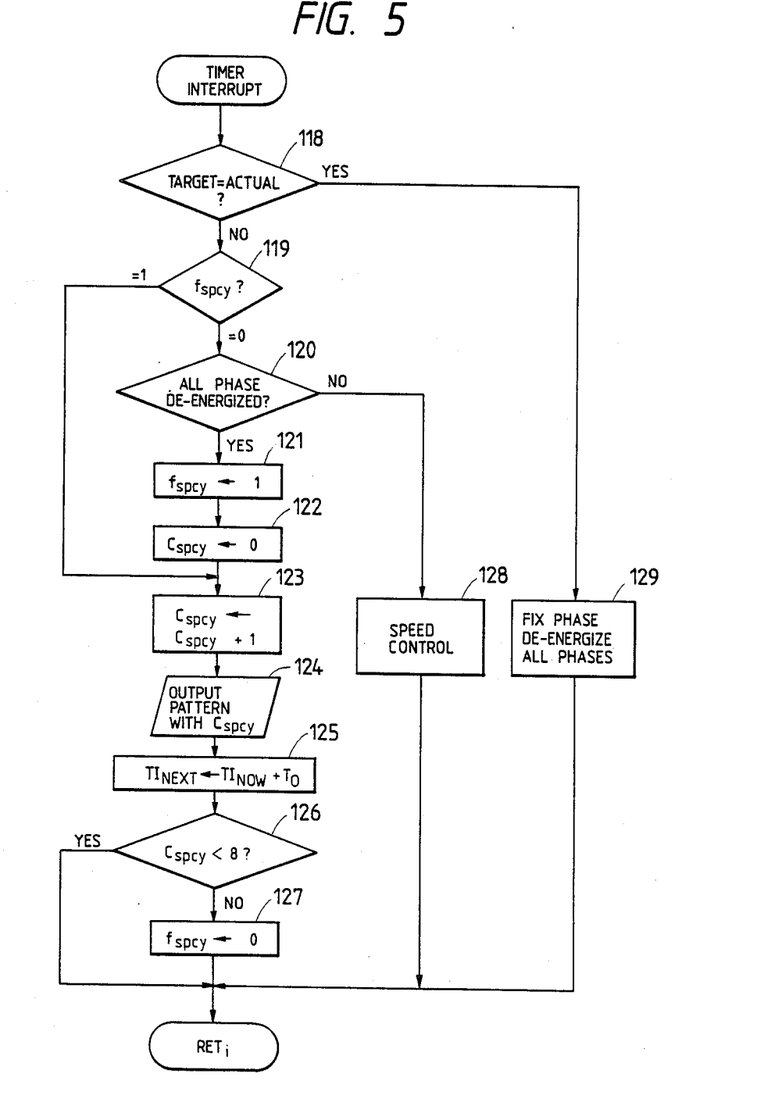
FIG. 5 is a flowchart of a timer interrupt subroutine of the program operating the control signal generation circuit of FIG. 3.

The subroutine is started by a timer-based interruption process. As shown in FIG. 5, a first step 118 of the subroutine determines whether or not the target value which was given by the main routine equals an actual value derived from the output signal of the throttle angle sensor 66. When the target value differs from the actual value, the program advances to a step 119. When the target value equals the actual value, the program advances to a step 129.

The step 129 performs a phase fixing process or an all-phase de-energization process. The phase fixing process holds the present phase energization pattern executed or outputted. The all-phase de-energization process interrupts the supply of currents to all the motor windings 9b-9e. After the step 129, the present execution cycle of the subroutine ends and the program returns to the main routine.

The step 119 checks a flag "fspcy" which represents a step position synchronization range. When the flag "fspcy" is "0", the program advances to a step 120. When the flag "fspcy" is "1", the program jumps to a step 123.

The step 120 determines whether or not the stepping motor 9 is in an all-phase de-energized state, that is, whether or not all the motor windings 9b-9e are being de-energized, on the basis of the states of the phase selection signals "b"-"e". When the stepping motor 9 is in the all-phase de-energized state, the program advances to a step 121. When the stepping motor 9 is out of the all-phase de-energized state, the program advances to a step 128.

The step 121 sets the flag "fspcy" to "1". After the step 121, the program advances to a step 122.

The step 122 resets a count value "Cspcy" to "0". The value "Cspcy" is used to count the number of periods related to the change of the effective phase energization pattern. After the step 122, the program advances to the step 123.

The step 123 increments the count value "Cspcy" by "1". After the step 123, the program advances to a step 124.

The step 124 selects one of the eight phase energization patterns 1-8 (see FIG. 2) in accordance with the count value "Cspcy". Specifically, eight different count values are previously allotted to the eight phase energization patterns respectively to identify them. The step 124 selects the phase energization pattern which corresponds to the present count value "Cspcy". In addition, the step 124 allows the phase selection signals "b"-"e" to be outputted which agree with the selected phase energization pattern. When the count values "Cspcy" are "1"-"8", the phase energization patterns 1-8 (see FIG. 2) are selected respectively.

A step 125 sets a value "TINEXT" equal to the sum of a value "TINOW" and a predetermined value "To". The value "TINOW" represents the moment of the present timer interruption, that is, the moment of the start of the present execution cycle of the subroutine. The predetermined value "To" corresponds to a preset interval, for example, which equals 20 msec. The value "TINEXT" determines the moment of a subsequent timer interruption, that is, the moment of the start of the next execution cycle of the subroutine. Accordingly, the moment of the occurrence of a subsequent timer interruption follows the moment of the occurrence of the present timer interruption by the preset interval corresponding to the value "To". In addition, the phase selection signals "b"-"e" which agree with the selected phase energization pattern remain outputted for the preset interval corresponding to the value "To".

Figure 6:
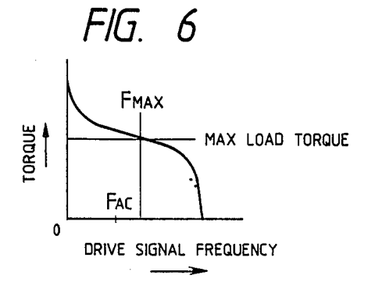
FIG. 6 is a graph showing the relationship between torque of the stepping motor and frequency of the drive signals to the stepping motor in the stepping motor control apparatus of FIGS. 1 and 3.

As shown in FIG. 6, the torque output of the stepping motor 9 decreases as the frequency of a drive signal to the stepping motor 9 increases. In FIG. 6, the drive signal frequency FMAX corresponds to the predetermined maximal load torque. The preset interval corresponding to the value "To" a is set longer than a period of the motor energization which occurs during normal control of the stepping motor 9. In addition, the preset interval is set equal to a value "1/FAC" larger than the value "1/FMAX" to generate a torque output of the stepping motor 9 greater than the maximal load torque. It should be noted that the character FAC denotes a drive signal frequency lower than the previously-mentioned frequency FMAX.

A step 126 following the step 125 compares the count value "Cspcy" with "8". When the count value "Cspcy" is equal to or greater than "8", the program advances to a step 127. When the count value "Cspcy" is smaller than "8", the present execution cycle of the subroutine ends and the program returns to the main routine.

The step 127 resets the flag "fspcy" to "0". After the step 127, the present execution cycle of the subroutine ends and the program returns to the main routine.

The step 128 performs a motor speed control process. The motor speed control process increases or decreases the rotational speed of the stepping motor 9 by gradually shortening or lengthening the time of a phase energization pattern, that is, the duration of the phase selection signals "b"-"e" in one phase energization pattern. Specifically, the moment of the timer interruption is controlled in accordance with a constant or constants determining the acceleration or deceleration of the stepping motor 9. After the step 128, the present execution cycle of the subroutine ends and the program returns to the main routine.

During a start of the stepping motor 9, the control apparatus operates as follows. In a first execution cycle of the subroutine during a start of the stepping motor 9, since a target value differs from an actual value and since the stepping motor 9 is in the all-phase de-energized state, the program moves through the steps 118-126 sequentially and the phase selection signals "b"-"e" in the phase energization pattern 1 (see FIG. 2) are outputted by the step 124. In a second execution cycle of the subroutine, the program moves through the steps 118, 119, 123, 124, 125, and 126 sequentially and the phase selection signals "b"-"e" in the phase energization pattern 2 (see FIG. 2) are outputted by the step 124. Similarly, the phase selection signals "b"-"e" in the phase energization patterns 3-8 are sequentially outputted. Accordingly, one series or one cycle of the phase energization patterns 1-8 is completed. The period of the change of the phase energization pattern is determined by the period of the execution of the subroutine. The period of the change of the phase energization pattern is preferably chosen to correspond to a low frequency so that a torque adequate to reliably start the stepping motor 9 can be generated. In an eighth execution cycle of the subroutine, the step 127 resets the flag "fspcy" to "0". In a ninth execution cycle of the subroutine and later execution cycles of the subroutine, since the flag "fspcy" is "0", the program moves through the steps 118, 119, 120, and 128 sequentially so that the motor speed control process is performed by the step 128.

During the start of the stepping motor 9, the combination of the steps 119, 120, 126, and 127 limits the interval during which the stepping motor 9 is driven by the low-frequency signals. After this limited interval, the motor speed control step 128 allows the stepping motor 9 to be driven by high-frequency signals. Specifically, after the limited interval, the sequence of the phase energization patterns 1-8 is effected cyclically with a high frequency of the change of the phase energization pattern. Accordingly, the stepping motor 9 can be reliably started and also the output shaft of the stepping motor 9 can be quickly moved to the target position.

Figure 7:
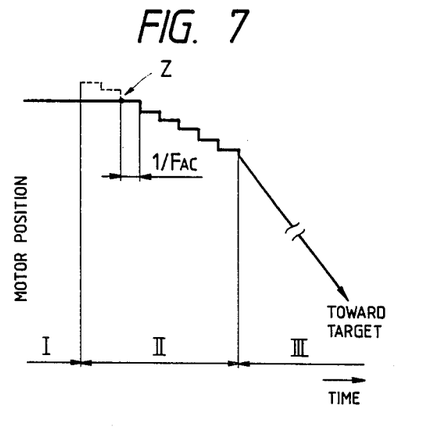
FIG. 7 is a diagram showing time-dependent variations in the angular position of the output shaft of the stepping motor during a start of the stepping motor in the stepping motor control apparatus of FIGS. 1 and 3.

During such a start, the stepping motor 9 operates as follows. As shown in a range I of FIG. 7, while the stepping motor 9 is in the all-phase de-energized state, the output shaft of the stepping motor 9 remains fixed in a given angular position. At a moment between the range I and a range II of FIG. 7, a motor starting control process is initiated. In the range II, the stepping motor 9 is subjected to the starting control process in which one cycle of the phase energization patterns 1-8 (see FIG. 2) is completed as described previously. In this range II, the angular position of the output shaft of the stepping motor 9 varies stepwise in correspondence with the change of the phase energization patterns 1-8. At a moment Z in the range II, the angular position of the output shaft of the stepping motor 9 is synchronized with the phase selection signals "b"-"e". In the range II, during the interval prior to the moment Z, the output shaft of the stepping motor 9 remains in the given angular position independent of the phase selection signals "b"-"e". After the moment Z, the output shaft of the stepping motor 9 synchronously responds to the phase selection signals "b"-"e". While the stepping motor 9 remains in the all-phase de-energization state, the sub throttle valve 65 is held by a return spring (not shown) in contact with a stopper (not shown) and thus the sub throttle valve 65 remains in a rest position corresponding to the given position of the output shaft of the stepping motor 9. As understood from FIG. 7, the angular positions of the output shaft of the stepping motor 9 which correspond to the phase energization patterns 1 and 2 differ from the given position of the output shaft of the stepping motor 9. The angular position of the output shaft of the stepping motor 9 which corresponds to the phase energization pattern 3 equals the given position of the output shaft of the stepping motor 9. Accordingly, the angular position of the output shaft of the stepping motor 9 is synchronized with the phase selection signals "b"-"e" at a moment where the phase energization pattern 3 is made effective. In a start of the stepping motor 9 under other conditions, while one cycle of the phase energization patterns 1-8 is completed, the angular position of the output shaft of the stepping motor 9 is synchronized with the phase selection signals "b"-"e". In a range III following the range II, the stepping motor 9 is subjected to the speed control process so that the angular position of the output shaft of the stepping motor 9 quickly moves toward a target position.

The diagnosis circuit 2 includes a microcomputer having a combination of an input/output circuit, a central processing unit, a read-only memory (ROM), and a random-access memory. The microcomputer of the diagnosis circuit 2 and the microcomputer of the control signal generation circuit 1 may be in common. The diagnosis circuit 2 operates in accordance with a diagnosis program stored in the ROM.

Figure 8:
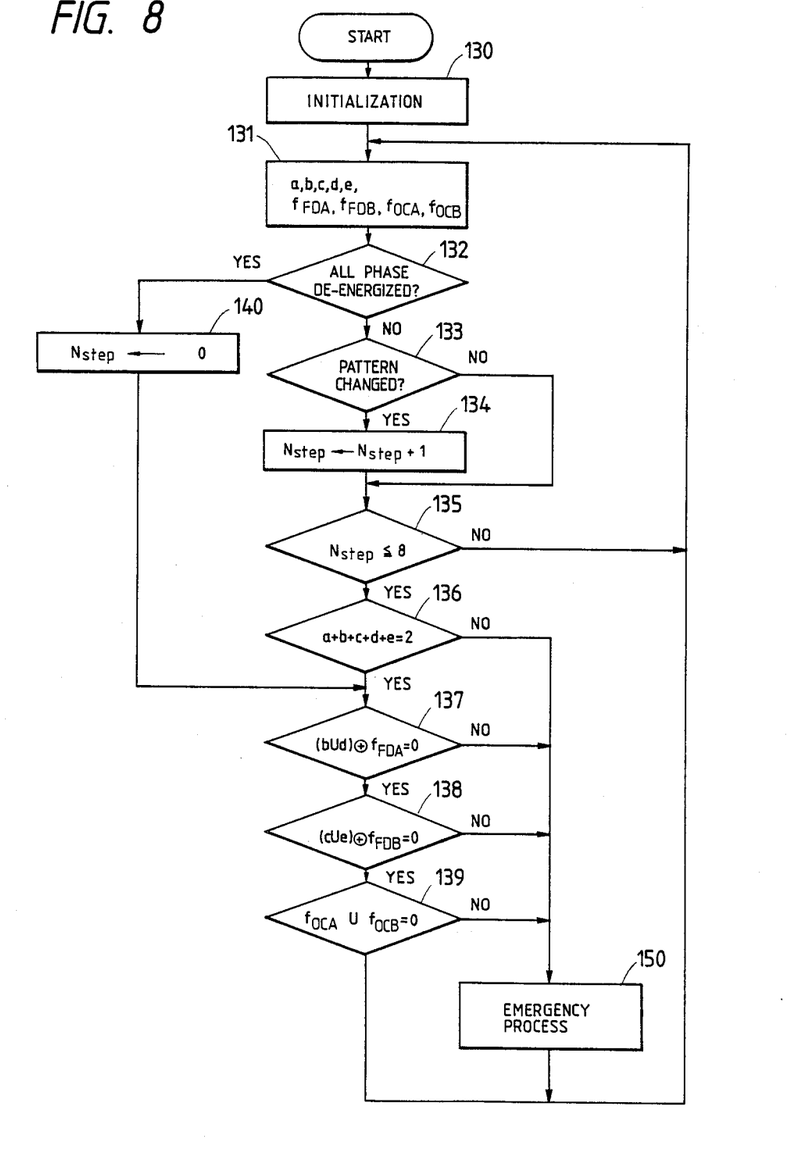
FIG. 8 is a flowchart of a program operating the diagnosis circuit of FIG. 3.

As shown in FIG. 8, a first step 130 of the diagnosis program performs an initialization process in which variables are cleared to respective initial values. After the step 130, the program advances to a step 131.

The step 131 inputs the current change signal "a", the phase selection signals "b"-"e", overcurrent detection signals $f_{OCA}$ and $f_{OCB}$, and phase current detection signals $f_{FDA}$ and $f_{FDB}$.

Figure 9:
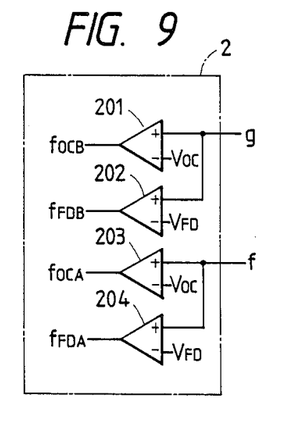
FIG. 9 is a block diagram of a portion of the diagnosis circuit of FIG. 3.

As shown in FIG. 9, the diagnosis circuit 2 includes comparators 201, 202, 203, and 204. The comparator 201 outputs an overcurrent detection signal $f_{OCB}$ which assumes "1" when the level of the feedback signal "g" exceeds a reference voltage $V_{OC}$ for overcurrent detection. The comparator 202 outputs a phase current detection signal $f_{FDB}$ which assumes "1" when the level of the feedback signal "g" exceeds a reference voltage $V_{FD}$ for phase current detection. The phase current reference voltage $V_{FD}$ is lower than the overcurrent reference voltage $V_{OC}$. The comparator 203 outputs an overcurrent detection signal $f_{OCA}$ which assumes "1" when the level of the feedback signal "f" exceeds the overcurrent reference voltage $V_{OC}$. The comparator 204 outputs a phase current detection signal $f_{FDA}$ which assumes "1" when the level of the feedback signal "f" exceeds the phase current reference voltage $V_{FD}$.

Returning to FIG. 8, a step 132 following the step 131 determines whether or not the stepping motor 9 is in the all-phase de-energized state by referring to the phase selection signals "b"-"e". When the stepping motor 9 is out of the all-phase de-energized state, the program advances to a step 133. When the stepping motor 9 is in the all-phase de-energized state, the program advances to a step 140.

The step 133 determines whether or not a phase energization pattern has changed to a new one, that is, whether or not one step, of one cycle of the phase energization patterns 1-8 has been performed. When the phase energization pattern has changed, the program advances to a step 134. When the phase energization pattern has not yet changed, the program jumps to a step 135.

The step 134 increments a counter value "Nstep" by "1". After the step 134, the program advances to the step 135.

The step 135 compares the counter value "Nstep" with "8". When the counter value "Nstep" is equal to or smaller than "8", the program advances to a step 136. When the counter value "Nstep" is greater than "8", the program returns to the step 131.

The step 136 determines whether or not the sum of the levels of the signals "a"-"e" equals "2". As shown in FIG. 2, in each of the phase energization patterns 1-8, the sum of the levels of the signals "a"-"e" normally equals "2". When the sum of the levels of the signals "a"-"e" equals "2", the program advances to a step 137. When the sum of the levels of the signals "a"-"e" differs from "2", that is, when a malfunction occurs, the program advances to an emergency step 150.

The step 140 resets the counter value "Nstep" to "0". After the step 140, the program advances to the step 137.

The step 137 determines whether or not the result of the Exclusive OR operation between the phase selection signal "b" or "d" and the phase current detection signal $f_{FDA}$ equals "0", that is, whether or not the phase selection signal and the phase current detection signal are in the same logical levels. It should be noted that the result of this Exclusive OR operation normally equals "0". When the result of the Exclusive OR operation equals "0", the program advances to a step 138. When the result of the Exclusive OR operation differs from "0", that is, when a malfunction occurs, the program advances to the emergency step 150.

The step 138 determines whether or not the result of the Exclusive OR operation between the phase selection signal "c" or "e" and the phase current detection signal $f_{FDB}$ equals "0", that is, whether or not the phase selection signal and the phase current detection signal are in the same logical levels. It should be noted that the result of this Exclusive OR operation normally equals "0". When the result of the Exclusive OR operation equals "0", the program advances to a step 139. When the result of the Exclusive OR operation differs from "0", that is, when a malfunction occurs, the program advances to the emergency step 150.

The step 139 determines whether or not both of the overcurrent detection signals $f_{OCA}$ and $f_{OCB}$ are "0". It should be noted that both of the overcurrent detection signals $f_{OCA}$ and $f_{OCB}$ are normally "0". When both of the overcurrent detection signals $f_{OCA}$ and $f_{OCB}$ are "0", the program returns to the step 131. When at least one of the overcurrent detection signals $f_{OCA}$ and $f_{OCB}$ is "1", that is, when a malfunction occurs, the program advances to the emergency step 150.

The step 150 de-energizes the control winding of the main relay 17 to open the switch of the main relay 17. As a result, the stepping motor 9 is forced into the all-phase de-energized state. In addition, the step 150 activates the warning lamp 16 to inform the occurrence of the malfunction. After the step 150, the program returns to the step 131.

The step 135 allows the malfunction detection steps 136-138 to be performed only during the execution of one starting period of one complete cycle of phase energization of stepping motor 9 that includes patterns 1-8. Since the interval during which one cycle of the phase energization patterns is completed corresponds to a start of the stepping motor 9 and since the frequency of the drive signals to the stepping motor 9 during this interval is lower than the frequency of the drive signals to the stepping motor 9 during normal operation, the diagnosis related to the stepping motor 9 and the control circuit for the stepping motor 9 can be performed reliably. In addition, since the interval during which one cycle of the phase energization patterns is completed corresponds to a start of the stepping motor 9, the drive of the stepping motor 9 can be interrupted immediately when a malfunction is detected. The interruption of the drive of the stepping motor 9 does not cause an appreciable change of the behavior of the vehicle since the drive interruption is performed at the start of the stepping motor 9.

It should be noted that various modifications may be made in this embodiment. For example, the phase selection signals may be in 2-phase energization patterns to increase the speed of the stepping motor.

What is claimed is:

1. An apparatus for controlling a stepping motor driving a throttle valve in an internal combustion engine, the stepping motor having a plurality of windings in different phases respectively, the apparatus comprising:
    (a) first detecting means for detecting an all-phase de-energized state of the stepping motor in which all of the motor windings are de-energized;
    (b) means for, after said first detecting means detects the all-phase de-energized state, sequentially energizing the motor windings in accordance with predetermined phase energization patterns, wherein each of said energizations of the motor windings lasts for a given interval chosen to allow the stepping motor to generate a starting torque greater than a predetermined load torque;
    (c) second detecting means for detecting when said energization means completes energizations of the motor windings corresponding to one cycle of said phase energization patterns; and
    (d) means for, after said second detecting means detects that one cycle of the phase energization patterns is completed, gradually shortening a plurality of durations of the energizations of the motor windings to increase a rotational speed of the stepping motor.

2. The apparatus of claim 1 further comprising means for checking whether or not said phase energization patterns are normal during an interval from a moment of a start of said energizations of the motor windings to a moment at which one cycle of the phase energization patterns is completed.

3. An apparatus for controlling a stepping motor having a plurality of windings, comprising:
    (a) first means for energizing the stepping motor by a first drive signal during a predetermined interval to start the stepping motor, said first drive signal having a first frequency, said first frequency being determined in accordance with a cycle of a sequence of phase selection signals;
    (b) second means for energizing the stepping motor by a second drive signal after the predetermined interval elapses, the second drive signal having a second frequency, said second frequency being determined in accordance with said cycle of said sequence, the second frequency being higher than the first frequency; and
    (c) means for checking the energization of the stepping motor during the predetermined interval to detect a malfunction.

4. The apparatus of claim 3 further comprising means for indicating that the malfunction has been detected.

5. The apparatus of claim 3 wherein the first and second means comprise means for sequentially energizing the windings of the stepping motor in accordance with the predetermined sequence of phase selection signals, and wherein the predetermined interval corresponds to one cycle of the sequence of phase selection signals.

6. The apparatus of claim 3 wherein the checking means perform the checking under conditions where the stepping motor is energized from a state in which all of the windings of the stepping motor are de-energized.

* * * * *